United States Patent [19]

Saitou et al.

[11] Patent Number: 5,126,935

[45] Date of Patent: Jun. 30, 1992

[54] POS SYSTEM INCLUDING USE OF EXPIRATION DATES IN COMMODITY CODES

[75] Inventors: Takeshi Saitou; Katsumi Yoshida; Ikuo Shimanuki; Kimikazu Sato, all of Hadano; Shigenori Takagi, Toyama, all of Japan

[73] Assignees: Hitachi, Ltd., Tokyo; Hitachi Computer Engineering Co., Ltd., Hadano, both of Japan

[21] Appl. No.: 433,761

[22] Filed: Nov. 9, 1989

[30] Foreign Application Priority Data

Nov. 11, 1988 [JP] Japan .................. 63-283688

[51] Int. Cl.⁵ .......................................... G07G 1/12
[52] U.S. Cl. ...................................... 364/405; 235/383
[58] Field of Search ................ 364/401, 405; 235/385, 235/383

[56] References Cited

U.S. PATENT DOCUMENTS 4,674,041 6/1987 Lemon .................. 364/401
4,882,695 11/1989 Nichtberger ............ 364/479
5,008,519 4/1991 Cunningham ............ 235/487

Primary Examiner—Gail O. Hayes
Attorney, Agent, or Firm—Kenyon & Kenyon

[57] ABSTRACT

A POS terminal device which performs the function of a cash register upon input of a commodity code, with date and hour data included in the commodity code being checked at the time of data input and a caution indication that the term of validity has expired or the term of validity is approaching. The POS terminal device comprising time measuring device, input device for inputting a commodity code including date and hour data, judgment step for comparing date and hour data indicated by the time measuring device with date and hour data included in a commodity code inputted by the input device, and caution device, whereby in the case where the date and hour data indicated by the time measuring device represents a time not earlier than that represented by the date and hour data included in the commodity code as a result of comparison in the judgment step, and which informs an operator about that fact.

11 Claims, 4 Drawing Sheets

| TWO LEADING DIGITS OF COMMODITY CODE | DATE AND HOUR DATA AREA IS PRESENT IN CODE | DATE AND HOUR DATA | THE NUMBER OF DAYS AREA FOR DELIVERY TERM | THE NUMBER OF DAYS FOR CHECKING WHETHER TERM OF VALIDITY IS NEARING OR NOT | |
|---|---|---|---|---|---|
| 20 | 1 | DATE OF PRODUCTION | 0 | 0 | |
| 21 | 1 | | 1 | 0 | |
| 22 | 2 | TERM OF VALIDITY | 0 | 7 | |
| 23 | 2 | | 0 | 14 | |
| 24 | 2 | | 0 | 0 | |
| 25 | 0 | | 0 | 0 | |
| | | | | | |

FIG. 3

| NO. | INPUT CODE AREA 51 | INPUT DATE AND HOUR DATA AREA 52 | DELIVERY TERM DATA AREA 54 | DATE AND HOUR LIMIT DATA AREA 53 | INTERNAL CODE AREA 55 |
|---|---|---|---|---|---|
| 1 | 2012340515 | 0515 | 0515 | — | 2012340000 |
| 2 | 2112350520 | 0520 | 0521 | — | 2112350000 |
| 3 | 2212360519 | 0519 | — | — | 2212360000 |
| 4 | 2212360525 | 0525 | — | 0518 | 2212360000 |
| 5 | 2312370625 | 0620 | — | 0604 | 2312370000 |
| 6 | 2412380620 | 0620 | — | 0620 | 2412380000 |
| 7 | 2512391234 | — | — | — | 2512391234 |

FIG. 4

DATE AND HOUR DATA OF TIME MEASURING MECHANISM SECTION 4: 5/20

No. OF FIG. 3

1: 5/15 △ ▲1 — TERM OF DELIVERY EXPIRED
2: 5/20 △  5/21 ▲1 — TERM OF DELIVERY IS O.K.
3: 5/19 △ — TERM OF RELISH EXPIRED
4: 5/18 ▲2  5/25 △ — TERM OF RELISH IS APPROACHING
5: 6/4 ▲2  6/20 △ — TERM OF RELISH IS O.K.
6: 6/20 △ ▲2 — TERM OF RELISH IS O.K.
7: — O.K.

△ INPUT DATE AND HOUR DATA AREA 52
▲1 DELIVERY TERM DATA AREA 54
▲2 DATE AND HOUR LIMIT DATA AREA 53

POS SYSTEM INCLUDING USE OF EXPIRATION DATES IN COMMODITY CODES

BACKGROUND OF THE INVENTION

The present invention relates to a POS terminal device, and in particular to a POS terminal device having function of administering the terms of commodities.

In conventional administration of relish terms of commodities, dates of production and the like are manually checked in stores and the like, and commodities left out of check are removed from stores by pointing out of shopping customers when those customers become aware of the fact. Therefore, commodities with relish terms expired are sold with the fact being unknown, and claims are advanced later, resulting in a problem.

In selling commodities such as milk bearing dates of production and having a lowered degree of freshness at a discount, dates are checked by operators, and the operators must input discounted prices to POS terminals, owing man power much.

In case there is some degree of width since the date of production until the relish term or the term of validity as in canned goods and medicines, it is difficult to check whether commodities bearing terms approaching the expiration are arranged in the store or not, resulting in another problem.

Further, check of the term of delivery representing the time from the production of a commodity to carrying-in thereof into a store, which is performed as commodity inspection at the time of carrying-in in order to guarantee the degree of freshness of the commodity, relies upon man power. Especially when there are a plurality of commodities which are different in term of delivery, errors tend to occur in check performed by man power, resulting in another problem.

SUMMARY OF THE INVENTION

The present invention aims at solving the above described problems by providing a POS terminal with time measuring mechanism, by providing the POS terminal with means for storing therein date and hour data administration information indicating predetermined terms and the like for every commodity, every commodities subject to identical administration, or all commodities en bloc, by providing the POS terminal with means for judging inputted date and hour data on the basis of date and hour data of the time measuring mechanism and the date and hour data administration information, by generating a caution or making an automatic discount by using discount means on the basis of the result of judgement, by, after generation of an alarm, making a discount by means of manual operation of the operator and the discount means or canceling the registration of that commodity by means of registration cancel means, and by automatically performing the term administration.

In case date and hour data contained in an inputted commodity code is date and hour data indicating the term of validity, the date and hour data is compared with date and hour data represented by the above described time measuring mechanism and term data contained in date and hour administration information, in a POS terminal device according to the present invention. When the inputted date and hour data has a value preceding that of the date and hour data of the time measuring mechanism, a caution informing of that fact is generated. When the inputted date and hour data has a value not earlier than that of the date and hour data of the time measuring mechanism and falling in the range represented by the term data, a caution informing of that fact is generated or automatic discount sale is performed by means of the discount means. Further, after generation of the caution, a discount is made by means of the discount means or registration of that commodity is canceled by the registration cancel means in response to an operator's directive.

In case inputted date and hour data is date and hour data representing production date, a caution is generated or automatic discount sale is performed by means of discount means if the date and hour data of the time measuring mechanism indicates date and hour not earlier than that defined by the inputted date and time data and the term data. Further, after generation of the alarm, a discount is made by means of the discount means or registration of that commodity is canceled by means of registration cancel means in response to an operator's directive.

BRIEF DESCRIPTION OF THE DRAWINGS

FIG. 3 is a diagram showing relations among an inputted commodity code, date and hour data contained in that code, date and hour data written into a delivery term data area 54, date and hour data written into a date and hour limit data area 53, and a converted internal code.

FIG. 4 is a diagram showing relations between date and hour data of respective data areas (52, 53 and 54) and date and hour data of time measuring mechanism 4.

DESCRIPTION OF THE PREFERRED EMBODIMENT

A preferred embodiment of the present invention will hereafter be described by referring to drawings.

It is now assumed that each commodity code used in the present embodiment is a 12-digit code beginning with 2 and two leading digits are defined by the classification of date and hour data, the classification of term administration and the like. Further, it is assumed that each commodity is registered into a PLU file comprising a commodity code having a form with the date and hour data section set at "0", and commodity information such as the commodity name and the price corresponding to the commodity code.

Figures 1, 2:
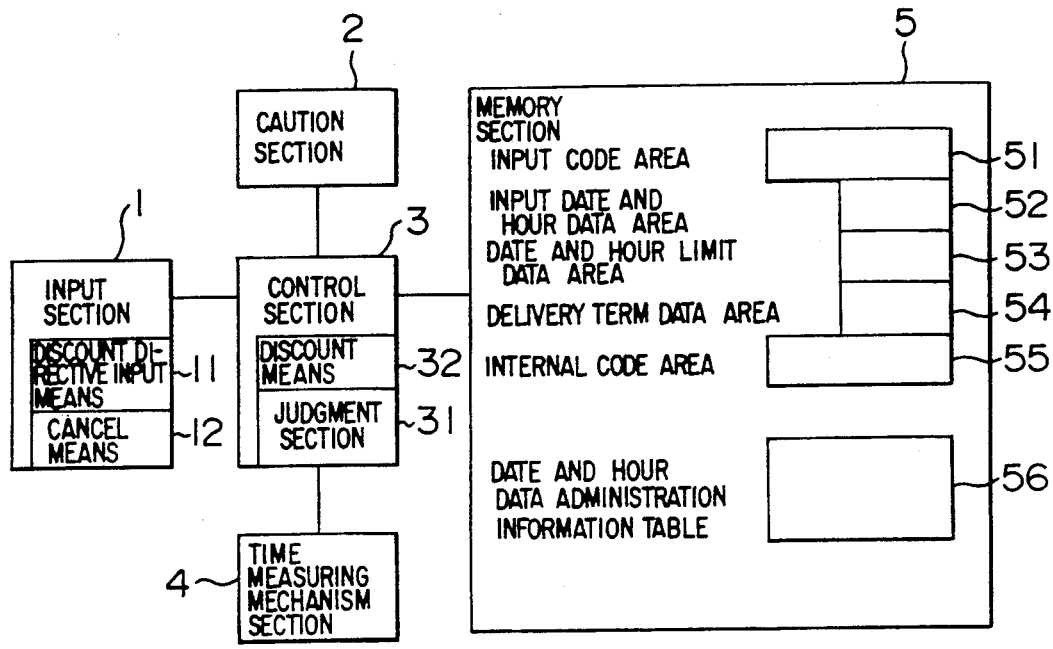
FIG. 1 is a block diagram of a POS terminal device according to the present invention.
FIG. 2 is a detailed diagram of a date and hour data administration information table 56 shown in FIG. 1.

FIG. 1 is a block diagram of a POS terminal device according to the present invention. The POS terminal device comprises a commodity code input section 1 including discount directive input means 11 and registration cancel means 12, a caution section 2, a control section 3 including a judgment section 31 for making various judgments on the basis of date and hour data and automatic discount means 32, a time measuring mechanism section 4 and a memory section 5.

The memory section 5 comprises an input code area 51 for holding a commodity code inputted from the input section 1, an input date and hour data area 52 for holding date and hour data taken out of the commodity code, a date and hour limit data area 53 for holding date and hour limit data obtained by subtracting a term value 563, which is the number of check days preceding the term of validity, from the value of the input date and hour data area 52, a delivery term data area 54 for holding delivery term data having a value equivalent to the value of the input date and hour data area 52 plus the value of number of delivery term days 562, an internal code area 55 for holding data obtained by converting data of the input code area 51 into a code for the purpose of search of the PLU file, and a date and hour data administration information table 56 wherein information for administering the date and hour data and comprising two leading digits of the commodity code is registered.

The date and hour data administration information table 56 is administered by means of two leading digits of the commodity code. As shown in FIG. 2, the date and hour data administration information table 56 comprises a date and hour classification area 561 representing whether the code contains date and hour data or not and representing classification of the data (i.e., whether the data represents date of production or the term of validity) if the code contains date and hour data, an area 562 for the number of days of delivery term indicating a period lasting up to the delivery term, and an area 563 for the number of days of check indicating a period for checking whether the term of validity is approaching or not.

When the value of the date and hour data classification code area 561 is 0, it is meant that the commodity code does not contain date and hour data. When the value of the date and hour data classification code area 561 is 1, it is meant that the date and hour data represents date of production and the number of days area 562 for delivery term should be referred to. When the value of the date and hour data classification code area 561 is 2, it is meant that the date and hour data contained in the commodity code is the term of validity and the number of check days area 563 should be referred to.

In a line having 20 as two leading digits of commodity code, the date and hour data represents the date of production, and the number of days area 562 for delivery term is 0 to represent that the commodity should be delivered within the day of production. Since it is not checked whether the term of validity is approaching or not, 0 is already set into the number of check days area 563.

In a line having 21 as two leading digits of commodity code, the date and hour data represents the date of production, and the number of days area 562 for delivery term is 1 to represent that the commodity should be delivered by the day after the day of production. In the same way as the line of commodity code 20, it is not checked whether the term of validity is approaching or not.

In each of lines respectively having 22, 23 and 24 as two leading digits of commodity code, the date and hour data represents the date of production and 0 is already set into the number of days area 562 for delivery term. Since the number of days for checking whether the term of validity is approaching or not is 7, 14 or 0, a caution is issued or a discount sale is made since 7 or 14 days before the term of validity, or only the expiration of the term of validity is checked.

In a line having 25 as two leading digits of commodity code, date and hour data is not contained in the commodity code and any check is not performed.

FIG. 3 shows examples of a code taken into the input code area 51, date and hour data taken out from that code and held in the input date and hour data area 52, date and hour data derived from the above described date and hour data on the basis of the date and hour data administration information area 56 and held in the delivery term data area 54 and the date and hour limit data area 53, and data for PLU file search held in the internal code area 55.

Assuming now that the date and hour data of the time measuring mechanism is 0520 (i.e., May 20), sequence relations between this data and respective date and hour data of FIG. 3 are shown in FIG. 4.

As application of the POS terminal device according to the present invention, commodity inspection which is the check performed at the time of delivery of commodities to a store and use at the time of sale of commodities to shopping customers are considered.

Figure 5:
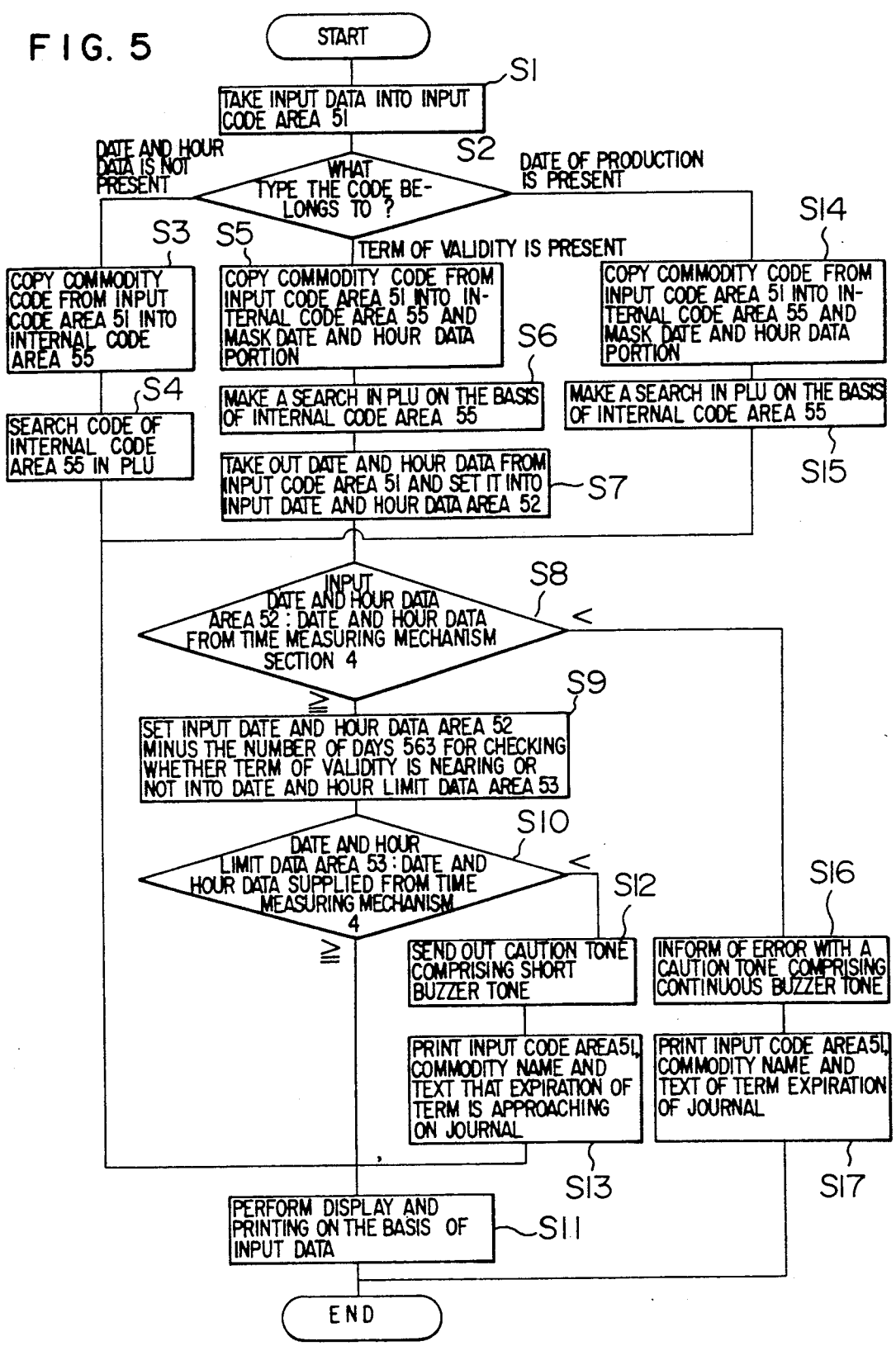
FIGS. 5 and 6 are flow charts showing flow of processing performed in the present POS terminal device.
Figure 6:
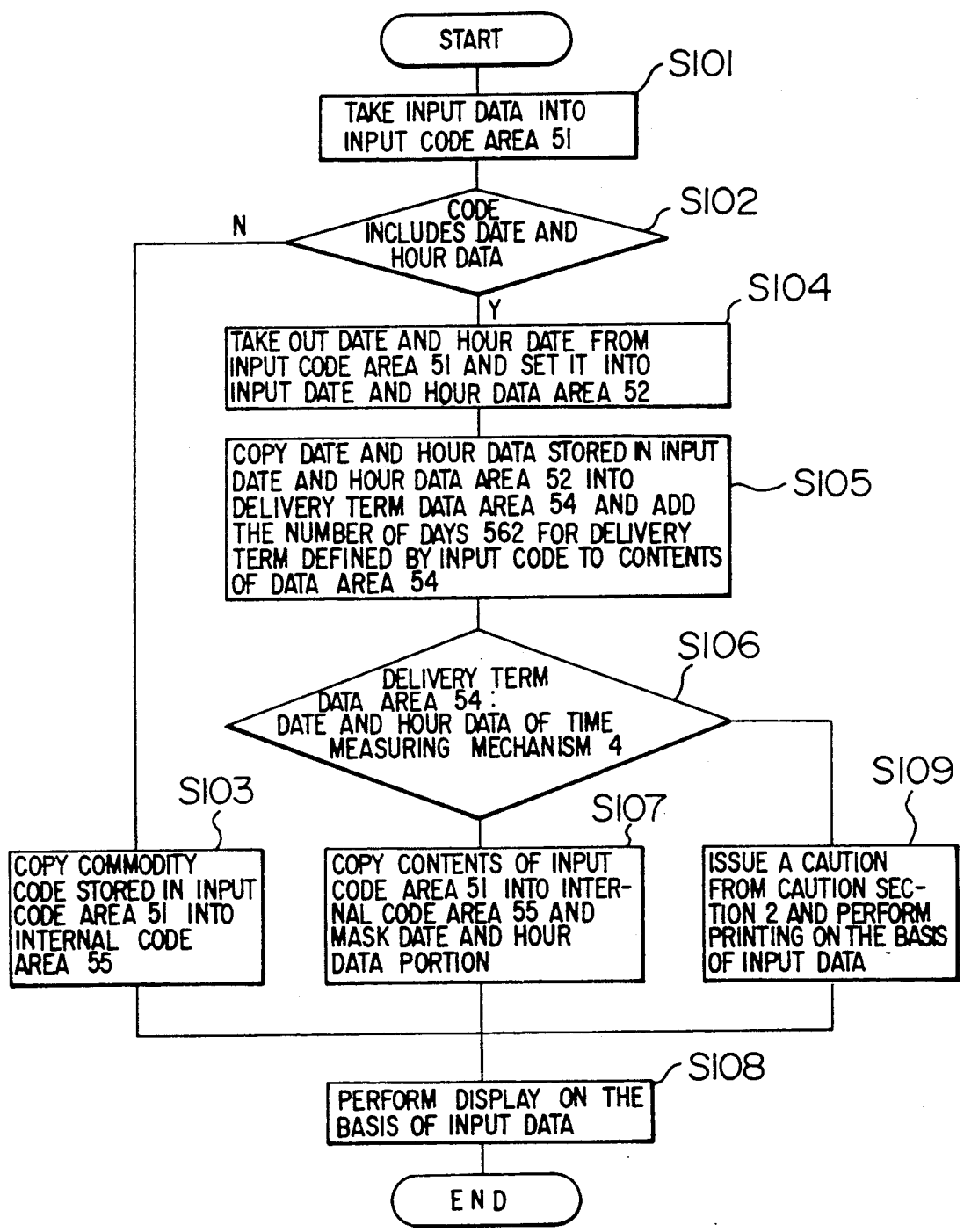

Processing in commodity inspection and sale will hereafter be described by referring to FIGS. 6 and 5, respectively.

Processing flow in commodity inspection is shown in the flow chart of FIG. 6.

When a commodity code is inputted from the input section 1, that commodity code is written into the input code area 51 (S101). Two leading digits of the commodity code written into the input code area 51 are searched in the date and hour data administration information table 56 to check whether the inputted commodity code includes date and hour data or not. If the inputted commodity code includes date and hour data (as in No. 1 to No. 6 of FIG. 3), processing proceeds to S104. Unless the inputted commodity code includes date and hour data (as in No. 7 of FIG. 3), processing proceeds to S103 (S102).

Unless the inputted commodity code includes date and hour data, the inputted commodity code stored in the input code area 51 is copied into the internal code area 55 as it is and processing proceeds to S108 without checking date and hour data (S103).

If the inputted commodity code includes date and hour data, the date and hour data portion is taken out of the commodity code stored in the input code area 51 and written into the input date and hour data area 52 (S104). A value obtained by adding the value of the number of days 562 for delivery term corresponding to two leading digits of the commodity code to the date and hour data thus is written into the delivery term data area 54 as delivery term data (S105). The value of the delivery term data area 54 is then compared with the value indicated by the time measuring mechanism 4. If the data indicated by the time measuring mechanism 4 has a larger value (as in Nos. 1 and 3 of FIG. 3), the term of delivery is passed and hence processing proceeds to S109. Otherwise (as in Nos. 2, 4, 5 and 6 of FIG. 3), the data is normal and processing proceeds to S107 (S106).

If the term of delivery has already expired, a caution is issued from the caution section 2 and printing based upon input data is performed in a printing section which is not illustrated to report expiration of the term of delivery to the operator. And processing then proceeds to S108 (S109). At S107, copy contents of input code area 51 into internal code area 55 and mask date and hour data portion then proceeds to S108.

At S108, display based upon the input data is performed by a display section which is not illustrated.

The operator lays aside that commodity and begins to check the next commodity. Thereby, it is prevented that a commodity produced many days before is brought into the store.

Processing performed in a sale proceeds along a flow shown in the flow chart of FIG. 5.

When a commodity code is inputted from the input section 1, that commodity code is written into the input code area 51 (S1). Two leading digits of this code are searched in the date and hour data administration information table 56 to check whether date and hour data is present in the commodity code or not and check its classification. If the commodity code does not include date and hour data (as in No. 7 of FIG. 3), processing proceeds to S3. If the commodity code includes date and hour data representing the term of validity (as in Nos. 3 to 6 of FIG. 3), processing proceeds to S5. If the commodity code includes data and hour data representing the date of production (as in Nos. 1 and 2 of FIG. 3), processing proceeds to S14 (S2).

When the inputted commodity code does not include date and hour data, the commodity code is read out from the input code area 51 and copied into the internal code area 55 as it is (S3). Thereafter, the code of the internal code area 55 is searched in the PLU file to read out the name, price and the like of the commodity (S4). They are displayed on the display section, and a text is printed by the printing section (S11).

If the commodity code includes date and hour data representing the term of validity, the inputted commodity code is first read out from the input code area 51, and its date and hour data portion is masked. The resultant code for PLU file search is written into the internal code area 55 (S5). This internal code is searched in the PLU file to obtain the name, price and the like of the commodity (S6). Date and hour data included in the commodity code stored in the input code area 51 is taken out and written into the input date and hour data area 52 (S7). The date and hour data representing the term of validity stored in the input date and hour data area 52 is compared with data indicated by the time measuring mechanism 4. If the data represented by the time measuring mechanism 4 is not later in time (i.e., not larger in value) than data of the input date and hour data area 52, processing proceeds to S9. If the data represented by the time measuring mechanism 4 is later in time (i.e., larger in value) than data of the input date and hour data area 52, the term of validity has already expired and hence processing proceeds to S16 (S8).

At S16, a caution is issued from the caution section 2 to inform the operator of expiration of the term of validity. Thereafter, data of the input code area 51, the commodity name obtained by making a search in the PLU file, and the fact that the term of validity has expired are printed on a journal (S17).

If the term of validity does not expire yet, a value obtained by substracting the value of the area 563 for the number of days of check from the value of the input date and hour data area 52 is written into the date and hour limit data area 53 (S9). The value of the date and hour limit data area 53 is compared with the value of the time measuring mechanism 4 (S10). If the value of the time measuring mechanism 4 is larger, the term of validity is considered approaching and processing proceeds to S12. Otherwise, processing proceeds to S11, where data of the input code area 51, and the name, price and the like of the commodity obtained by making a search in the PLU file are printed by the printing section and are displayed by the display section.

When the term of validity is approaching, a caution that the expiration of the term is approaching is given to the operator by the caution section 2 (S12). Data of the input code area 51, text representing that the term of validity is approaching and text of commodity name obtained by the PLU file search are printed (S13). Thereafter processing proceeds to S11, where data such as the name, price and the like of the commodity obtained by the PLU file search are printed and displayed on the display section (S11).

If a caution is issued, the operator who has known that the term of validity of the commodity held in hand is approaching can consult with the store master or the floor master or sell a new commodity brought from a showcase. When it happens that an identical commodity is not present because of absence of stock and the customer admits purchase of that commodity as a result of consultation with the customer, that commodity is sold as it is or a discount is made on the basis of directive fed from the discount directive input means 11 on the input section 1 as a result of consultation.

If the customer rejects the purchase of that commodity, registration is canceled by the registration cancel means 12 on the input section 1 to abandon the sale of that commodity and registration of the next commodity is started.

If the date and hour data included in the commodity code represents the date of production as a result of judgment as S2, the commodity code of the input code area 51 is read out and that commodity code with the date and hour data portion masked is written into the internal code area 55 as the code for PLL file search (S14). This input code is searched in the PLU file to read out the corresponding commodity name, price and the like (S15). Further, the data of the input code area 51 and the commodity name, price and the like obtained by the PLU file search are printed and displayed on the display section (S11).

For a commodity whose term of validity is approaching or has already expired, only generation of a caution and printing onto the journal are performed at S12, S13, S16 and S17. In addition to the caution, or instead of caution, however, the commodity may be sold at an automatic discount.

An embodiment of a POS terminal device according to the present invention has heretofore been described. In the above described embodiment, the date and hour data included in the commodity code is either date of production or the term of validity. However, it is also conceivable to provide a commodity code with a plurality of date and hour data or provide the date and hour data administration information with various interval values so that administration of various terms may be performed on the basis of a single date and hour data included in the commodity code.

Further, in the above described embodiment, information for administering date and hour data are independently provided. However, such information may be provided for each commodity in the PLU file.

In the above described example of "commodity inspection", the PLU search is made before checking the term in order to print the input code and the commodity name of that code. If the commodity name is known by different means, the term check may be made earlier than the PLU search.

Further, expiration of term, approaching expiration of term and its input code are printed onto journal. Instead, however, it is also possible to write data into a file comprising a commodity code, commodity name as well as the date and hour of check, and make a report therefrom. Thereby, it becomes possible to grasp what commodities have lowered degree of freshness by merely seeing the report from that file without examining the journal one by one, recheck of the showcase being facilitated.

Further, this report may be issued as a report when use of that POS terminal by that operator is finished or this report may be used as a report at the time of exact calculation.

In the above described example, checked date and hour data represents month and day. However, it may represent year and month, or year, month and day. Further, it may comprise hour. Interval values 562 and 563 for representing that expiration of term is nearing may also comprise months and hours.

It is now assumed in the above described example that all commodities do not substantially undergo check of approaching expiration of term of validity but undergo check of only expiration of term of validity as shown in case of No. 6 of FIG. 3. By eliminating in this case the steps of S9, S10, S12 and S13 in the flow chart of FIG. 5, it becomes possible to clearly understand that the basic concept is comparison of the input date and hour data with the date and hour data of the device.

Further, two code formats respectively comprising "year and month" and "year, month and day" may be simultaneously used. If all commodities have identical formats and identical number of check days, it is not necessary to divide commodities into respective codes. Commodities en bloc to be checked may have check interval values 562 and 563. Further, each commodity, i.e., each PLU file may have this check term value.

In the above described example, a single-stage code has date and hour data. Instead, however a JAN long code having date and hour data somewhere may be considered. (When input data exceeds 13 digits, two or three data each comprising 8 or 13 digits are used to represent one commodity in case of JAN long code.)

Further, in the above described example, date and hour data comprises either date of production or the term of validity. However, the input code may comprise both data. Further, it is also possible that the input code contains data of production date but does not contain data of the term of validity, whereas the device has the interval value of the term and the term is checked when the commodity is sold to a shopping customer. Considering that processing performed in the flow chart of "commodity inspection" shown in FIG. 6 is executed at the time of "sale", the number of days 562 for delivery term may be regarded as the interval of validity, the modification just described being implemented.

Instead of generation of a caution in use in a system including the date of production, automatic discount function by means of the discount means 32 may be used so that milk of today may sell at a fixed price and milk of yesterday may sell at a discount of 20% with respect to the fixed price.

In accordance with the present invention, date and hour data included in the commodity code is checked at the time of data input in a POS terminal device and a caution indicating that the term of validity has expired or the term of validity is approaching is issued as heretofore described. It is thus possible to prevent that commodities are sold to shopping customers in a state gain notoriety and claims are advanced. Further, processing such as selling commodities having lowered degree of freshness at a discount can be automatically performed, resulting in lightened burden of the operator.

We claim:

1. A POS terminal device for performing cash registering upon input of a commodity code, comprising:
   time measuring means;
   input means for inputting a commodity code including date and hour data;
   judgment means for comparing date and hour data indicated by said time measuring means with date and hour data included in a commodity code inputted by said input means; and
   caution means, whereby in case the date and hour data indicated by said time measuring means represents a time not earlier than that represented by the date and hour data included in the commodity code as a result of comparison in said judgment means, an operator is informed about that fact.

2. A POS terminal device according to claim 1, wherein said POS terminal device further includes discount means and discount directive input means, and in case a caution is issued by said caution means, a discount sale is made by said discount means upon directive fed from said discount directive input means.

3. A POS terminal device according to claim 1, wherein said POS terminal device further includes cancel means started by the operator so as to cancel registration, and registration cancel is performed by said cancel means in case a caution is issued by said caution means.

4. A POS terminal device for performing cash registering upon input of a commodity code, comprising:
   time measuring means;
   input means for inputting a commodity code including date and hour data;
   a date and hour data administration information table storing therein information for administering date and hour data predetermined for each commodity in response to an inputted commodity code;
   judgment means for comparing date and hour data indicated by said time measuring means with date and hour data included in a commodity code inputted by said input means; and
   caution means, whereby in case the date and hour data indicated by said time measuring means represents a time not earlier than that represented by the date and hour data included in the commodity code as a result of comparison in said judgment means, an operator is informed about that fact.

5. A POS terminal device according to claim 4, wherein said POS terminal device further includes discount means and discount directive input means, and in case a caution is issued by said caution means, a discount sale is made by said discount means upon directive fed from said discount directive input means.

6. A POS terminal device according to claim 4, wherein said POS terminal device further includes cancel means started by the operator so as to cancel registration, and registration cancel is performed by said cancel means in case a caution is issued by said caution means.

7. A POS terminal device for performing cash registering upon input of a commodity code, comprising:
   time measuring means;
   input means for inputting a commodity code including date and hour data;

a date and hour data administration information table storing therein information for administering date and hour data predetermined for each commodity group in response to a commodity code group;

judgment means for comparing date and hour data indicated by said time measuring means with date and hour data included in a commodity code inputted by said input means; and caution means, whereby in case the date and hour data indicated by said time measuring means represents a time not earlier than that represented by the date and hour data included in the commodity code as a result of comparison in said judgment means, an operator is informed about that fact.

8. A POS terminal device according to claim 7, wherein said POS terminal device further includes discount means and discount directive input means, and in case a caution is issued by said caution means, a discount sale is made by said discount means upon directive fed from said discount directive input means.

9. A POS terminal device according to claim 7, wherein said POS terminal device further includes cancel means started by the operator so as to cancel registration, and registration cancel is performed by said cancel means in case a caution is issued by said caution means.

10. A POS terminal device for performing cash registering upon input of a commodity code, comprising:

time measuring means;

input means for inputting a commodity code including date and hour data;

a date and hour data administration information table storing therein information for administering date and hour data predetermined for each commodity in response to an inputted commodity code;

judgment means for comparing date and hour data indicated by said time measuring means with date and hour data included in a commodity code inputted by said input means;

caution means, whereby in case the date and hour data indicated by said time measuring represents a time not earlier than that represented by the date and hour data included in the commodity code as a result of comparison in said judgment means, an operator is informed about that fact;

a file comprising a commodity code, for which a caution has been issued, and commodity information regarding said commodity code; and means for specifying output from said file.

11. A POS terminal device for performing cash registering upon input of a commodity code, comprising:

time measuring means;

input means for inputting a commodity code including date and hour data;

a date and hour data administration information table storing therein information for administering date and hour data predetermined for each commodity group in response to a commodity code group;

judgment means for comparing date and hour data indicated by said time measuring means with date and hour data included in a commodity code inputted by said input means;

caution means, whereby in case the date and hour data indicated by said time measuring means represents a time not earlier than that represented by the date and hour data included in the commodity code as a result of comparison in said judgment means, on operator is informed about that fact;

a file comprising a commodity code, for which a caution has been issued, and commodity information regarding said commodity code; and means for specifying output from said file.

* * * * *